UNITED STATES PATENT OFFICE.

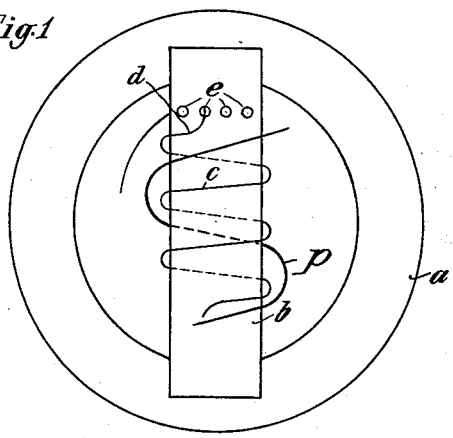
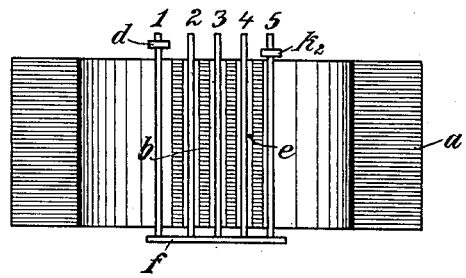
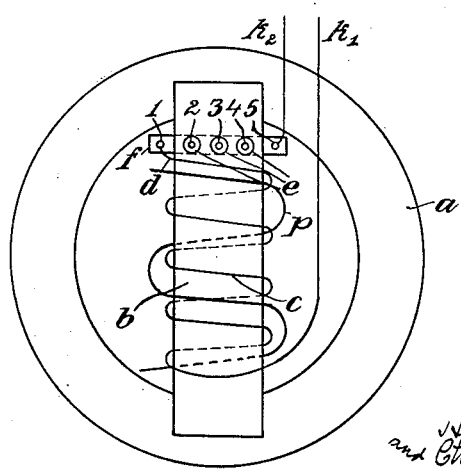

HERMANN GEWECKE AND CHRISTIAN BAEUMLER, OF NUREMBERG, GERMANY, ASSIGNORS TO SIEMENS-SCHUCKERT WERKE, G. M. B. H., OF SIEMENSSTADT, NEAR BERLIN, GERMANY, A CORPORATION OF GERMANY.

MEASURING-TRANSFORMER.

1,133,466.  Specification of Letters Patent.  Patented Mar. 30, 1915.

Application filed November 3, 1914. Serial No. 870,153.

*To all whom it may concern:*

Be it known that we, HERMANN GEWECKE and CHRISTIAN BAEUMLER, German subjects, residing at Nuremberg, Bavaria, Germany, have invented certain new and useful Improvements in Measuring-Transformers, of which the following is a specification.

Our present invention relates to a measuring transformer for electrical instruments and consists in brief in providing special arrangements for accurately attaining a desired ratio of transformation. Furthermore, a transformer constructed according to this invention will permit the ratio of transformation to be adjusted either during manufacture or during testing.

Heretofore it had been usual to adjust the ratio of transformation in measuring transformers by switching on or off one or more turns of the primary or secondary circuit. The adjustment obtained in this manner, however, is only relatively coarse, since always complete winding turns are thus switched on or off.

For the exact adjustment of the ratio of transformation of the measuring transformer according to our present invention one or more turns of the secondary winding are arranged so as to be varied in position relatively to the magnetic flux, so that either the entire cross-section of the magnetic flux or only a part thereof will be inclosed by said turn or turns. In this manner the auxiliary or additional turns of the winding which inclose the flux of the lines of force may be increased or decreased until the desired ratio of transformation is attained. Also if instead thereof the respective part of the magnetic flux may be left unchanged and the number of the winding turns surrounding the same may be made greater or smaller or both of these methods may be combined.

In the drawings Figure 1 shows diagrammatically a simple form of a measuring transformer according to our invention, Fig. 2 is a cross-section through a modified form of transformer and Fig. 3 a top view taken on Fig. 2.

The body of the transformer shown in Fig. 1, which may for instance be a current transformer, consists of sheets of iron $a$ of ring-like shape into which a laminated core $b$ is inserted which carries the coils of the transformer. The turns of the secondary winding which is shown in part in Fig. 1 are designated by the letter $c$ and the primary is shown by way of example at $p$. With the end of these turns one or more additional turns $d$ are connected which may be threaded through any one of the holes $e$, as shown, so that the convolution formed thereby will only partly surround the total magnetic flux. The E. M. F. which shall be generated in the turns $d$ will now determine which of the holes must be used for receiving the conductor $d$ in order to obtain the effect of a certain desired number of additional turns. Also if only a single hole or slot $e$ is provided the conductor $d$ must be carried around a part of the magnetic flux in such a number of turns that the desired E. M. F. will be generated in the secondary winding.

The additional turns may be positioned at any desired point of the magnetic flux. In the construction shown in the drawing these turns are placed upon the central core of the transformer, it is, however, understood that they may as well be placed upon the ring $a$ or upon an especial core which is passed by a part of the magnetic flux of the transformer.

In the construction according to Fig. 1 a certain inconvenience is found in carrying the auxiliary conductor $d$ through the holes in the iron core especially, if the end of the secondary winding itself, which consists of a rather strong and stiff wire, is used as such conductor. The adjusting conductor may therefore conveniently be made from a braided copper ribbon or the like, so that it may more easily be threaded through the holes of the iron core. The threading of a braided copper ribbon through the holes $e$ of the iron body, however, is often not convenient and in addition requires a proper connection with the main conductor of the winding. This inconvenience is avoided by a preferred modification of the transformer which is represented in Figs. 2 and 3.

The construction shown in Figs. 2 and 3 represents an adjustable auxiliary turn and comprises a rake which is inserted into properly spaced holes $e$ leading through the iron body $b$. This rake consists of a plurality of conductive bars which are conductively connected with each other on the one side of the iron body carrying the magnetic flux, while on the other side these bars are provided with free ends serving for the connection of the adjusting conductor and eventually for a conductor leading to the secondary terminal of the apparatus of the transformer. Any one of these bars may be selected for connection with the wire of the auxiliary secondary winding to thus become and constitute a portion of the auxiliary winding. In the core $b$ of the transformer in Figs. 2 and 3 there are shown three holes $e$ which divide the magnetic flux through the iron body into four parts. According to our invention the above-mentioned rake consists more particularly of five conducting bars 1, 2, 3, 4 and 5, of which three, namely the bars 2, 3 and 4, are inserted in the holes $e$ of the core, while two of said bars, namely 1 and 5 are passing said core on the outside thereof. On the one side of the core the end bar $f$ is arranged for conductively connecting said bars 1, 2, 3, 4 and 5, while the other ends of said bars project freely on the other side of the iron core above the surface thereof. The adjusting conductor $d$ as well as the conductor $k_2$ leading to the terminal of the apparatus may now be fastened as desired to any one of the ends of the bars 1, 2, 3, 4 and 5.

In the drawing the adjusting conductor $d$, may for instance, be connected to the end of the bar 1 and the conductor leading to the terminal to the end of the bar 5. The adjusting conductor $d$ together with the bar 1, the end bar $f$ and the bar 5 will in this case form a full turn of the secondary winding. This turn will become ineffective as secondary turn, if the adjusting conductor $d$ is also fastened to the bar 5. If therefore the adjusting conductor is fastened to one of the bars 2, 3 or 4 the effect will be obtained as if a turn were added to the winding. In order to switch off or render ineffective the secondary turn which is formed by the aid of said rake, the conductor $k_2$ could also be fastened to the bar 1 while the adjusting conductor $d$ is connected with this bar; for adding partial winding turns also the conductor $k_2$ could be fastened to one of the bars 2, 3 and 4. If the points of connection for the conductors $d$ and $k_2$ are displaced, the greatest number of steps of adjustment will be obtainable with the smallest number of bars in the rake. If, for instance two holes are provided in the iron core in such a manner that the three parts of the magnetic flux are in a ratio of $1:3:2$, six modes of connecting will be possible each mode differing from the subsequent by one sixth of a winding turn.

The fastening means for the conductor $d$ and $k_2$ may also be mounted upon a terminal board or the like and the connections made from the board instead of making the same at the ends of the bars of the rake.

Having thus described our invention we claim as new and desire to secure by Letters Patent of the United States:—

1. In a measuring transformer, the combination of a magnetizable core, a winding having an auxiliary portion, said auxiliary portion being adapted to encircle a smaller or greater part of the magnetic flux passing through said core.

2. In a measuring transformer, the combination of a magnetizable core, a secondary winding comprising an additional or auxiliary portion, said core having a number of holes arranged therein for dividing the magnetic flux and permitting connection to be made by said additional portion through anyone of said holes, whereby the ratio of transformation may be adjusted.

3. In a measuring transformer, the combination of a magnetizable core, a secondary winding, said core having a plurality of holes dividing the magnetic flux through said core, and an adjustable auxiliary turn in the form of a rake-shaped body of conductive material inserted into said holes to form a plurality of open turns, encircling said flux to a various extent and having their open ends projecting from said core thus permitting said secondary winding to include in circuit anyone of said turns for adjusting the ratio of transformation.

In testimony whereof we affix our signatures in presence of two witnesses.

HERMANN GEWECKE.
CHRISTIAN BAEUMLER.

Witnesses for Hermann Gewecke:
   WOLDEMAR HAUPT,
   HENRY HASPER.
Witnesses for Christian Baeumler:
   ALBERT BESOLD,
   OSCAR BOCK.